(12) United States Patent
Meindl et al.

(10) Patent No.: US 8,160,644 B2
(45) Date of Patent: Apr. 17, 2012

(54) PROCESSING DEVICE FOR THE CONTACTLESS COMMUNICATION WITH A DATA CARRIER WHICH IS DETACHABLY CONNECTED TO THE PROCESSING DEVICE

(75) Inventors: Reinhard Meindl, Graz (AT); Stefan Posch, Graz (AT)

(73) Assignee: NXP B.V., Eindhoven (NL)

( * ) Notice: Subject to any disclaimer, the term of this patent is extended or adjusted under 35 U.S.C. 154(b) by 1209 days.

(21) Appl. No.: 10/023,118

(22) Filed: Dec. 17, 2001

(65) Prior Publication Data

US 2002/0086704 A1    Jul. 4, 2002

(30) Foreign Application Priority Data

Dec. 20, 2000  (EP) ..................................... 00890381

(51) Int. Cl.
*H04W 4/00* (2009.01)
(52) U.S. Cl. ................... 455/558; 455/550.1; 455/556.1; 235/451; 235/492; 283/79; 283/81
(58) Field of Classification Search ................. 455/66.1, 455/90.1, 90.3, 556.1, 557, 558, 575.1, 575.8, 455/100, 550.1, 406, 407, 566, 575; 379/433; 235/451, 492; 283/79, 81
See application file for complete search history.

(56) References Cited

U.S. PATENT DOCUMENTS

| | | | | |
|---|---|---|---|---|
| 5,867,795 A * | 2/1999 | Novis et al. | ................ | 455/566 |
| 5,912,446 A * | 6/1999 | Wong et al. | ................ | 235/449 |
| 5,971,437 A * | 10/1999 | Sakashita | ................ | 283/81 |
| 6,115,583 A | 9/2000 | Brummer et al. | | |
| 6,226,189 B1 * | 5/2001 | Haffenden et al. | ........... | 361/814 |
| 6,292,561 B1 * | 9/2001 | Benson | ................ | 379/433.13 |
| 6,349,824 B1 * | 2/2002 | Yamada | ................ | 206/316.1 |
| 6,367,701 B1 * | 4/2002 | Fries | ................ | 235/486 |
| 6,404,643 B1 * | 6/2002 | Chung | ................ | 361/737 |
| 6,510,515 B1 * | 1/2003 | Raith | ................ | 713/163 |
| 6,526,287 B1 * | 2/2003 | Lee | ................ | 455/556.1 |
| 6,769,607 B1 * | 8/2004 | Pitroda et al. | ................ | 235/380 |
| 6,801,787 B1 * | 10/2004 | Page et al. | ................ | 455/556.1 |
| 7,051,933 B1 | 5/2006 | Nagaoka et al. | | |
| 7,058,397 B2 | 6/2006 | Ritter | | |
| 2001/0046850 A1 * | 11/2001 | Blanke et al. | ................ | 455/411 |

FOREIGN PATENT DOCUMENTS

| | | |
|---|---|---|
| EP | 0785634 A2 | 7/1997 |
| EP | 0820178 A2 | 1/1998 |
| JP | 10-302041 A | 11/1998 |
| JP | 11306307 A | 11/1999 |
| JP | 2000-76399 A | 3/2000 |
| KR | 1998-033182 | 9/1998 |
| WO | 00/46709 A2 | 8/2000 |
| WO | 0045328 A1 | 8/2000 |

OTHER PUBLICATIONS

English abstract of KR 1998-033182.

* cited by examiner

*Primary Examiner* — Pierre-Louis Desir

(57) ABSTRACT

A processing device (1; 14) having a housing (4) includes first communication means (2, 6) for receiving and/or transmitting an information signal (AS) and processing means (7) for processing the information signal (AS) received and/or to be transmitted, as well as second communication means (10, 11) for the contactless retrieval of control information (BI, TI) stored in a data carrier (12) which is detachably connected to the housing (4) of the processing device, which processing of the information signal (AS) by the processing device (1; 14) can be influenced with the aid of the retrieved control information (BI, TI).

20 Claims, 1 Drawing Sheet

PROCESSING DEVICE FOR THE CONTACTLESS COMMUNICATION WITH A DATA CARRIER WHICH IS DETACHABLY CONNECTED TO THE PROCESSING DEVICE

The invention relates to a processing device for processing an information signal, which processing of the information signal can be influenced by control information.

The invention further relates to a data carrier for the communication with the processing device.

Such a processing device is known from the document EP 0 785 634 A2. The known processing device is formed by a mobile telephone, which has a housing. The mobile telephone includes first communication means formed by an antenna and a telephone IC including its wiring. With the aid of the first communication means the mobile telephone is adapted to receive first audio information, which can be received from a transmitting/receiving antenna of a telephone provider in a transmission protocol executed by the telephone IC. Furthermore, the first communication means are adapted to insert second audio information applied to the telephone IC into the transmission protocol and to transmit this second audio information to the transmitting/receiving antenna.

The known mobile telephone further includes processing means for processing the first audio information and for apply a loudspeaker signal to a loudspeaker of the mobile telephone. The processing means are further adapted to process a microphone of the mobile telephone and to apply the second audio information to the telephone IC.

The known mobile telephone further includes second communication means formed by a plurality of SIM card holders together with connection leads and a part of the telephone IC. A SIM card is a plastic card which has a contact array having eight communication contacts and a telephone number IC, which telephone number IC forms a data carrier for the communication with the mobile telephone.

When the user of the mobile telephone inserts a SIM card into one of SIM card holders of the mobile telephone, control information stored in the telephone number IC can be read out with the aid of the second communication means of the mobile telephone via the communication contacts in a contact-bound manner. The control information stored in the telephone number IC defines at least the telephone number of the mobile telephone and of the telephone provider. The information transmitted in the communication protocol by the first communication means and, if applicable, also the manner of processing of the information signal by the processing means are dependent on the control information read out.

A SIM card holder of the mobile telephone is secured to an outer surface of the housing. The SIM card holders are connected to the outer surface of the housing by eight connecting leads by which the communication contacts of the SIM card holder are connected.

With the known mobile telephone it has proved to be a disadvantage that the user has to open the housing of the mobile telephone in order to insert the SIM card into the SIM card holder, which is arranged in the housing. The mechanical construction of the housing cover leads to higher production costs of the mobile telephone and, furthermore, the electronic circuitry of the mobile telephone is additionally exposed to environmental influences (dust, humidity, . . . ) when the housing is opened, which is also a disadvantage.

The SIM card holders secured to the outer surface of the housing have the disadvantage that the connecting leads as well as the SIM card holders are susceptible to damage.

With the known data carrier it has proved to be a disadvantage that contact-bound communication with the mobile telephone is possible only via the SIM card holder in the housing or via the SIM card holder secured to the housing, which SIM card holders have the disadvantages mentioned hereinbefore.

It is an object of the invention to provide a processing device of the type defined in the first paragraph and a data carrier of the type defined in the second paragraph, which preclude the aforementioned disadvantages. In order to achieve this object with such a processing device characteristic features in accordance with the invention are provided, in such a manner that the processing device can be characterized in the manner defined hereinafter.

A processing device for the processing of an information signal, the device having a housing and having first communication means for receiving and/or transmitting the information signal, and having processing means for the processing of the information signal received and/or to be transmitted, and having second communication means for the contactless retrieval of control information stored in a data carrier which is detachably connection to the housing of the processing device, in which the processing of the information signal by the processing means can be influenced with the aid of the retrieved control information.

In order to achieve said object with such a data carrier characteristic features in accordance with the invention are provided, in such a manner that the data carrier can be characterized in the manner defined hereinafter.

A data carrier embedded in an adhesive label, which adhesive label can be connected detachably to a processing device, which data carrier includes third communication means for the communication with the second communication means of the processing device as claimed in claim 1, and memory means for storing control information which can be processed by the processing device as claimed in claim 1.

This has the advantage that the user of the processing device merely has to connect the data carrier detachably to the housing of the processing device in order to enable communication of the second communication means with the data carrier. For this purpose, the user does not have to open the housing of the processing device, which is more convenient for the user and which protects the electronic circuitry in the processing device against environmental influences.

Since, as a result of the contactless communication of the second communication means with the data carrier, the housing of the processing device need not have any opening nor a cover, the processing device can be manufactured more cheaply and the housing can be, for example, watertight, dust-fight or even airtight. The detachable connection guarantees a reliable contactless communication and, moreover, the data carrier can always be detached from the housing and, if required, be replaced with another data carrier.

The measures defined in claim 2 have the advantage that the data carrier is included in a label that can be connected detachably to the housing of the processing device in a particularly simple manner.

The measures defined in claim 3 have the advantage that the data carrier can take the form of a passive data carrier and need not have a battery. As a result of this, the data carrier can be very small and consequently projects only slightly from the surface of the housing.

The measures defined in claim 4 have the advantage that the data carrier is connected to the housing inside the recess and therefore does not project at all from the housing surface around the recess. This virtually precludes the risk of damage to the data carrier.

By means of the measures defined in claim 5 a mobile telephone is obtained onto which the user, after having purchased the mobile telephone, merely has to stick a label from his telephone provider in order to "personalize" the mobile telephone (assign telephone number). Furthermore, the user can stick an additional label onto the mobile telephone, in whose data carrier a calling credit is stored in accordance with the prepay scheme.

The measures defined in claim 6 have the advantage that the mobile telephone complies with current standards and is therefore suitable for mass-marketing.

The measures defined in claim 7 have the advantage that a reproducing device (MP3 player, DVD player, CD player, computer, . . . ) is obtained by means of which an encrypted information signal (audio, video, image, . . . ) read from a recording medium can be reproduced, for which merely a data carrier, which communicates in a contactless manner and which represents the purchased right of reproduction, should be stuck onto the housing of the reproducing device. This is particularly simple for the user and the reproducing device does not require, for example, a holder for a smart card which communicates in a contact-bound manner.

The measures defined in claim 8 have the advantage that the encrypted information signal can, for example, be downloaded from a server connected to the internet.

The invention will be described in more detail hereinafter with reference to the Figures, which show two embodiments which are given by way of example but to which the invention is not limited.

Figure 1:
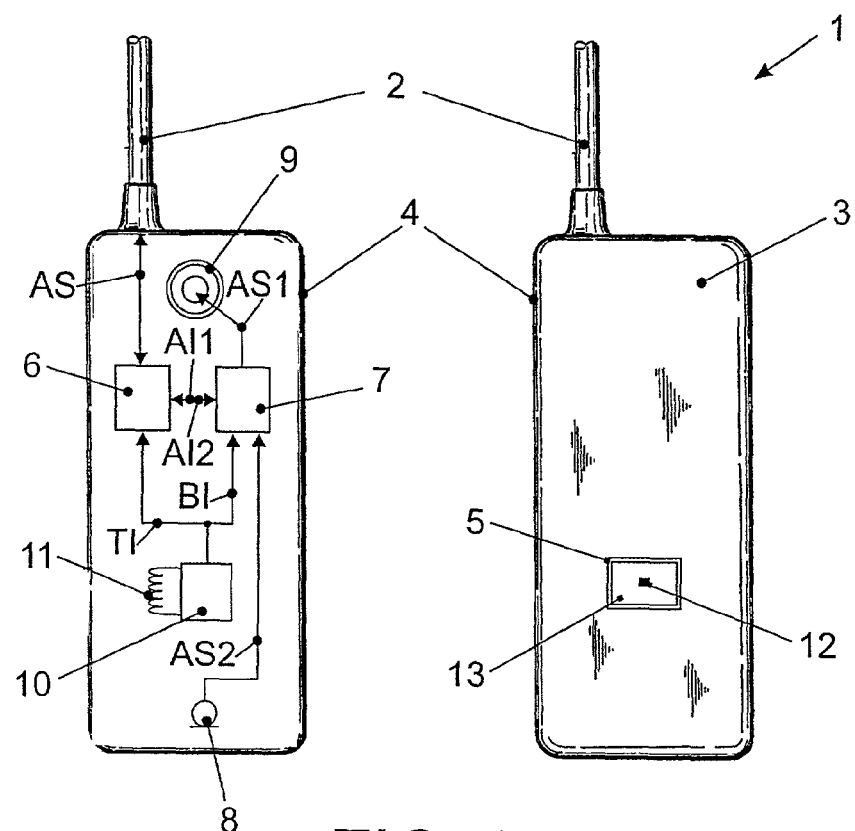
FIG. 1 shows the back of the housing of a mobile telephone and the functional blocks in the mobile telephone, which mobile telephone has communication means for the contactless communication with a SIM card stuck onto the back of the mobile telephone.

FIG. 1 shows the back of a mobile telephone 1, which forms a processing device, for processing an antenna signal AS, in accordance with a first embodiment the invention. The right-hand part of the representation of the mobile telephone 1 shows an antenna 2, a housing rear wall 3 of a housing 4 of the mobile telephone 1 and a recess 5 in the housing rear wall 3, which will be described in more detail hereinafter.

In the left-hand part of the representation of the mobile telephone 1 the housing rear wall 3 has been removed symbolically and the electronic circuitry in the mobile telephone 1 is shown as functional blocks arranged in the housing 4. These functional blocks of the mobile telephone 1 are telephone means 6, processing means 7, a microphone 8 and an loudspeaker 9.

When a telephone connection is established by means of the mobile telephone 1 the telephone means 6 carry out a transmission protocol in accordance with the GSM standard (ETS 300 607), the antenna 2 and the telephone means 6 forming first communication means. The telephone means 6 insert both user identification information BI (for example, the telephone number of the mobile telephone 1) and first audio information AI1 into the transmission protocol and read second audio information AI2 from the transmission protocol. With the aid of the antenna 2 the telephone means 6 receive the 900 MHz antenna signal AS and, in their turn, supply the antenna signal AS to the antenna 2, by means of which antenna signal AS said information is transmitted in accordance with the transmission protocol.

Once the telephone connection has been established by means of the mobile telephone 1 the mobile telephone 1 receives/transmits the antenna signal AS from/to a transmitting/receiving antenna of the telephone provider (for example, Mobilkom, MaxMobil or One in Austria) where the mobile telephone 1 has logged on. This technique, which is customary with mobile telephones, is known since long, for which reason the operation of the telephone means 6, the antenna 2 and the provider's transmitting/receiving antenna is not described in any further detail.

The telephone means 6 supply the first audio signal AI1 extracted from the antenna signal AS by the telephone means 6 to the processing means 7. The processing means 7 process the received first audio information AI1, the digital data of the first audio information AI1 being applied to a digital-to-analog converter and an amplified first analog audio signal AS1 thus obtained being applied to the loudspeaker 9 of the mobile telephone 1.

When the user of the mobile telephone 1 speaks into the microphone 8 once a telephone connection has been established a second analog audio signal AS2 is applied from the microphone 8 to the processing means 7. The processing means 7 include an analog-to-digital converter, by means of which the amplified second analog audio signal AS2 is digitized and is applied to the telephone means 6 as second audio information AI2.

The mobile telephone 1 now has transmitting/receiving means 10 and an HF antenna 11, which form second communication means for the contactless retrieval of control information. The control information is now formed by the information which to data is usually stored in a so-called SIM card (ETS 300 045) and is read out of a data carrier of the SIM card in a contact-bound manner via a SIM card holder. The control information includes the user identification information BI and telephone provider identification information TI, which identifies the telephone provider via whose network of transmitting/receiving antennas and switching equipment a telephone connection is established and maintained.

The transmitting/receiving means 10 are adapted to read this control information from a passive data carrier in accordance with the ISO/IEC-14443 standard in a contactless manner. For this purpose, the transmitting/receiving means 10 transmit an HF signal having a frequency of 13.56 MHz, which carries pulse-width modulated retrieval information from the transmitting/receiving means 10, upon which the data carrier 12 transfers the control information to the transmitting/receiving means 10 by means of load modulation. The operation of such transmitting/receiving means 10 and such a data carrier 12 are disclosed, for example, in the document WO00/45328, which is incorporated in the disclosure of the present document by reference.

The transmitting/receiving means 10 can apply the user identification information BI and the telephone provider identification information TI retrieved from the data carrier 12 by said transmitting/receiving station 10 to the telephone means 6 and the processing means 7. The telephone means 6 are adapted to establish a telephone connection only after reception of the user identification information BI and the telephone provider identification information I. This is because it is not possible to establish a telephone connection by means of a newly purchased mobile telephone without the allocation of a telephone number and the telephone provider's transmitting/receiving antenna network to be used.

The data carrier 12 is now embedded in an adhesive label 13 and is detachably attached to housing rear wall 3 of the mobile telephone 1 by means of the adhesive label 13. This has the advantage that the housing 4 of the mobile telephone 1 is wholly imperforate and need not be opened by the user for personalization (telephone number and telephone provider)

after the purchase. Thus, the watertight housing 4 of the mobile telephone 1 can be realized in a particularly cost-effective manner. In addition, the electronic circuitry of the mobile telephone 1 is protected against environmental influences such as dust and moisture or an electrostatic discharge as a result of the user touching the telephone means 6, which is very advantageous.

Moreover, it is particularly advantageous that after the purchase of the main bristles 1 the user merely has to purchase or collect the adhesive label at an outlet of the telephone provider and stick this adhesive label 13 onto the housing rear wall 3 of the mobile telephone 1 in order to make it possible to make his first telephone call with the mobile telephone 1. This makes for particularly simple handling by the user.

The housing rear wall 3 now has the recess 5 and a description of the mobile telephone 1 instructs the user to attach the adhesive label 13 in this recess 5. This has the advantage that the surface of the adhesive label 13 with the embedded data carrier 12 does not extend outside over the surface of the housing rear wall 3 beyond the recess 5. This precludes damage to the adhesive label 13 in the best possible way. Furthermore, the recess 5 has the advantage that the data carrier 12 is attached directly opposite the HF antenna 11 of the mobile telephone 1, thus guaranteeing an optimum communication via the short air transmission path.

The provision of the transmitting/receiving means 10, which transmit the HF signal, has the advantage that a passive data carrier 12 can be used as a data carrier 12 which communicates in a contactless manner. This enables a battery for the power supply of the data carrier 12 in the adhesive label 13 to be dispensed with, as a result of which the adhesive label 13 is particularly thin.

It is to be noted that a further adhesive label could be attached to the housing rear wall 3, in which label another data carrier is embedded, which stores a calling credit of the user. During each telephone call made by the user the telephone charge is deducted from the calling credit thus stored. When the user's calling credit is used up the user could detach the further adhesive label from the housing rear wall and replace it with a new adhesive label with a new calling credit. One or more further adhesive labels could be applied side by side or, alternatively, onto one another, which is particularly advantageous as a result of the close proximity to the HF antenna 11.

It is to be noted that the second communication means may also be adapted to provide capacitive contactless communication or inductive contactless communication in accordance with another standard, for example ISO/IEC15693.

It is to be noted that the first communication means could also be adapted to communicate in accordance with another telephone standard, for example the UMTS standard and that video information or other information could be transmitted in accordance with the transmission protocol of the standard.

It is to be noted that the adhesive label with the embedded data carrier may be applied to the housing of the processing device at an arbitrary location. The location of the second communication means in the housing as well as a location on the housing which provides optimum protection against damage may then play a role. However, the adhesive label may, in any case, also be attached to the housing front side of the processing device.

It is to be noted that a multitude of further possibilities of detachably connecting a data carrier to a housing are known to one skilled in the art. For example, the data carrier may be inserted into a holder arranged on the housing exterior. Likewise, magnetic forces may be used in order to connect the data carrier detachably to the housing of the processing device.

Figure 2:
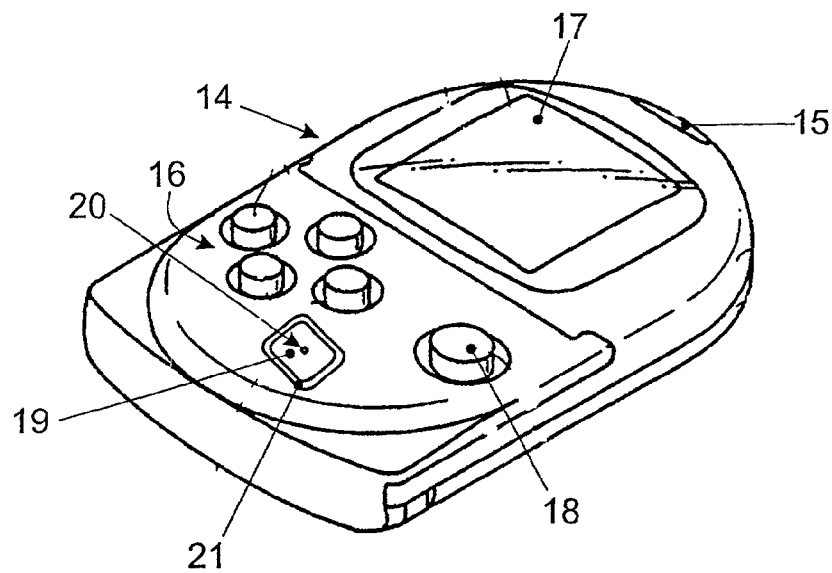
FIG. 2 shows an MP3 player which can be connected to the internet and by means of which encrypted audio information can be loaded into a reproduction memory of the MP3 player, the MP3 player having communication means for the contactless communication with a data carrier stuck onto the back of the MP3 player.

FIG. 2 shows an MP3 player 14 which forms a processing device in accordance with a second embodiment of the invention. The MP3 player 14 can be connected to the internet with the aid of a connector 15. By means of keys 16 and a display 17 a connection can be established with a computer server (for example, Napster) connected to the internet and storing encrypted audio information of pieces of music, encoded in accordance with the MP3 encoding method.

A user of the MP3 player 14 can select, for example, the piece of music "Kleine Nachtmusik" from a list of titles of pieces of music displayed by means of the display 17 and can subsequently actuate a download key 18. Subsequently, the encrypted and encoded audio information is downloaded from the computer server and stored in a memory of the MP3 player 14.

The encrypted and encoded audio information stored in the MP3 player 14 can only be decrypted by decryption means of the MP3 player 14 when appropriate key information is applied to the decryption means. The user of the MP3 player can now buy an adhesive label 19 with an embedded data carrier 20 which stores exactly the appropriate key information. By purchasing the adhesive label 19 the user acquires a reproduction right for one or more pieces of music.

The reproduction right may be limited to a given number of stored pieces of music but also to a given number of reproduction sessions. Likewise, the reproduction right may allow reproduction (decryption) of given pieces of music (for example, classical music) and may require the purchase of another adhesive label for the reproduction of other pieces of music (for example, rock, performer: Beatles).

When the user has stuck the respective adhesive label on the MP3 player 14, the decrypting means of the MP3 layer 14 are arranged for decrypting the encrypted and encoded audio information and for reproducing the track "Kleine Nachtmusik" Thus, the processing of the received encrypted and encoded audio information is influenced by the key information retrieved from the data carrier in a contactless manner, so as to allow decryption of the received audio information.

This has the advantage that a reproduction right for decrypted information downloadable from the internet can be purchased very easily in the form of an adhesive label in an arbitrary shop, which label can be stuck onto the MP3 player. This makes for particularly simple handling by the user. In addition, a holder for a smart card having a data carrier for contact-bound communication can be dispensed with, as a result of which the processing device can be manufactured in a particularly cost-effective manner.

The MP3 player 14 has a recess 21 in which the adhesive label 19 can be stuck, as a result of which the advantages mentioned hereinbefore for the mobile telephone 1 are also obtained for the MP3 player 14.

It is to be noted that a processing device in accordance with the invention may be adapted to process arbitrary information signals (picture information, sound information, text information, video information). Furthermore, the relevant control information may cause the received information signal to be influenced in a widely varying manner.

The invention claimed is:

1. A processing device for the processing of an information signal, the device having a housing and having, first communication means disposed within the housing for receiving and/or transmitting the information signal, and having processing means for the processing of the information signal received and/or transmitted, and having second communication means disposed within the housing for the contactless retrieval of control information stored in a data carrier, wherein the data carrier is a SIM card, wherein the data carrier is disposed completely outside of the housing of the processing device and is adhesively attached to the housing of the processing device, and wherein the data carrier is configured to communicate wirelessly with the second communication means through a wall of the housing of the processing device, in which the processing of the information signal by the processing means can be influenced with the aid of the retrieved control information, wherein the first communication means are adapted to receive and to transmit a telephone signal and whose processing means are adapted to process the telephone signal received and to be transmitted, and in which the control information retrieved from the detachably connected data carrier by the second communication means identifies a telephone number of the user of the processing device and/or includes calling credit information.

2. A processing device as claimed in claim 1, in which the detachable connection of the data carrier to the housing of the processing device is formed by an adhesive joint.

3. A processing device as claimed in claim 1, in which the second communication means are adapted to generate a high frequency signal which can be utilized by the detachably connected data carrier to generate an internal supply voltage and to communicate with the control information.

4. A processing device as claimed in claim 1, in which the housing of the processing device has a recess, in which recess the data carrier can be connected detachably to the housing.

5. A processing device as claimed in claim 4, in which the first communication means are adapted to operate in accordance with the GSM standard and/or the UMTS standard.

6. A processing device as claimed in claim 1, in which the processing device is a reproducing device for the reproduction of an encrypted information signal, whose first communication means are adapted to receive the encrypted information signal and whose processing means are adapted to decrypt the received encrypted information signal, and in which the control information retrieved from the detachably connected data carrier by the second communication means includes key information for decrypting the received encrypted information signal.

7. A processing device as claimed in claim 6, in which the first communication means can be connected to a data network in order to retrieve the encrypted information signal.

8. A data carrier embedded in an adhesive label, which adhesive label can be connected detachably to a processing device, which data carrier includes third communication means for the communication with the second communication means of the processing device as claimed in claim 1, and memory means for storing control information which can be processed by the processing device as claimed in claim 1.

9. A data carrier as claimed in claim 8, in which the data carrier is adapted to provide contactless communication in accordance with the ISO14443 standard.

10. The processing device of claim 1, wherein the data carrier is detachably connected by magnetic means.

11. The processing device of claim 1, further including a second data carrier detachably connected to the housing of the processing device.

12. The processing device of claim 1, wherein the housing of the processing device does not have an opening.

13. The processing device of claim 12, wherein the housing of the processing device does not have a cover.

14. The processing device of claim 12, wherein the housing of the processing device is watertight.

15. The processing device of claim 12, wherein the data carrier is embedded in an adhesive label, and wherein the adhesive label is attached to the housing of the processing device at a location on the housing that provides optimum protect against damage to the data carrier.

16. The processing device of claim 15, wherein the adhesive label is attached to a rear wall of the housing of the processing device.

17. The processing device of claim 16, wherein the rear wall has a recess, wherein the adhesive label is attached to the rear wall in the recess such that a surface of the adhesive label does not extend over the rear wall beyond the recess.

18. The processing device of claim 17, wherein the data carrier is attached directly opposite the second communication means with respect to the rear wall of the housing.

19. The processing device of claim 18, wherein the processing device is a DVD player, a CD player or a computer.

20. The processing device of claim 1, wherein the data carrier is disposed completely outside of the housing of the processing device while the first communication means receives and transmits the telephone signal.

\* \* \* \* \*